(12) United States Patent
Delgado

(10) Patent No.: US 11,735,878 B2
(45) Date of Patent: Aug. 22, 2023

(54) ELEVATED OUTLET ASSEMBLY

(71) Applicant: Samuel Delgado, Dodge, TX (US)

(72) Inventor: Samuel Delgado, Dodge, TX (US)

( * ) Notice: Subject to any disclaimer, the term of this patent is extended or adjusted under 35 U.S.C. 154(b) by 0 days.

(21) Appl. No.: 17/464,137

(22) Filed: Sep. 1, 2021

(65) Prior Publication Data

US 2023/0062070 A1    Mar. 2, 2023

(51) Int. Cl.
| | |
|---|---|
| *H01R 24/20* | (2011.01) |
| *H01R 25/00* | (2006.01) |
| *F16M 11/24* | (2006.01) |
| H01R 103/00 | (2006.01) |
| H01R 13/518 | (2006.01) |

(52) U.S. Cl.
CPC ......... *H01R 25/006* (2013.01); *F16M 11/247* (2013.01); *H01R 13/518* (2013.01); *H01R 24/20* (2013.01); *H01R 2103/00* (2013.01)

(58) Field of Classification Search
CPC .... H01R 25/006; H01R 13/518; H01R 24/20; H01R 25/003; H01R 31/06; H01R 13/73; F16M 11/247

See application file for complete search history.

(56) References Cited

U.S. PATENT DOCUMENTS

| | | | | |
|---|---|---|---|---|
| 5,937,881 | A | * | 8/1999 | Villa .................... A45B 23/00 |
| | | | | 135/21 |
| 6,805,581 | B2 | | 10/2004 | Love |
| 7,041,899 | B2 | | 5/2006 | Stekelenburg |
| 8,026,633 | B2 | | 9/2011 | Fleisig |
| 9,178,324 | B2 | | 11/2015 | Beldock |
| 9,675,146 | B1 | * | 6/2017 | Howell ................. A45B 23/00 |
| 9,685,730 | B2 | | 6/2017 | Jones |
| D806,035 | S | | 12/2017 | Byrne |
| 10,247,353 | B1 | * | 4/2019 | Chen .................... G03B 17/561 |
| 2015/0108841 | A1 | | 4/2015 | Weber |
| 2021/0311377 | A1 | * | 10/2021 | Salomon, Jr. ........ H01R 25/006 |

FOREIGN PATENT DOCUMENTS

| | | | | |
|---|---|---|---|---|
| CN | 111780722 A | * | 10/2020 | |
| WO | WO-2007043896 A1 | * | 4/2007 | ............. H01R 13/64 |

* cited by examiner

*Primary Examiner* — Tho D Ta

(57) ABSTRACT

An elevated outlet assembly includes a tripod that has a base and a plurality of legs each extending downwardly from the base. Each of the legs engages a support surface thereby elevating the base upwardly from the support surface. A disk is disposed on the base and a plurality of female electrical outlets is each integrated into the disk to receive a power plug from an electronic device. Each of the female electrical outlets is elevated when the tripod is positioned on the support surface to inhibit the power plug from the electronic device from coming into contact with moisture on the support surface. A power cord is coupled to and extends away from the disk and the power cord can be plugged into a power source to supply electrical power to the respective electronic device.

5 Claims, 4 Drawing Sheets

ELEVATED OUTLET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to outlet devices and more particularly pertains to a new outlet device for inhibiting electrical outlets from being exposed to water. The device includes a tripod and a disk that is mounted to the tripod. The device additionally includes a plurality of female electrical outlets that are integrated into the disk such that each of the female electrical outlets can be elevated above the support surface. In this way a plurality of electronic devices can be plugged into the female electrical outlets without exposing a power plug on the electronic devices to water.

(2) Description of Related Art Including Information Disclosed Under 37 CFR 1.97 and 1.98

The prior art relates to outlet devices including a tower that has female electrical outlets integrated into the tower and a cover that is positionable over the tower. The prior art discloses an outdoor electrical outlet which includes a spike for penetrating a support surface, a disk that is coupled to the spike for elevating the disk and an electrical outlet that is integrated into the disk. The prior art discloses a wall mountable outlet device that includes a disk that has a mounting element for mounting to a wall, a plurality of female electrical outlets that are each integrated into the disk and a cover that is positionable over the disk.

BRIEF SUMMARY OF THE INVENTION

An embodiment of the disclosure meets the needs presented above by generally comprising a tripod that has a base and a plurality of legs each extending downwardly from the base. Each of the legs engages a support surface thereby elevating the base upwardly from the support surface. A disk is disposed on the base and a plurality of female electrical outlets is each integrated into the disk to receive a power plug from an electronic device. Each of the female electrical outlets is elevated when the tripod is positioned on the support surface to inhibit the power plug from the electronic device from coming into contact with moisture on the support surface. A power cord is coupled to and extends away from the disk and the power cord can be plugged into a power source to supply electrical power to the respective electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
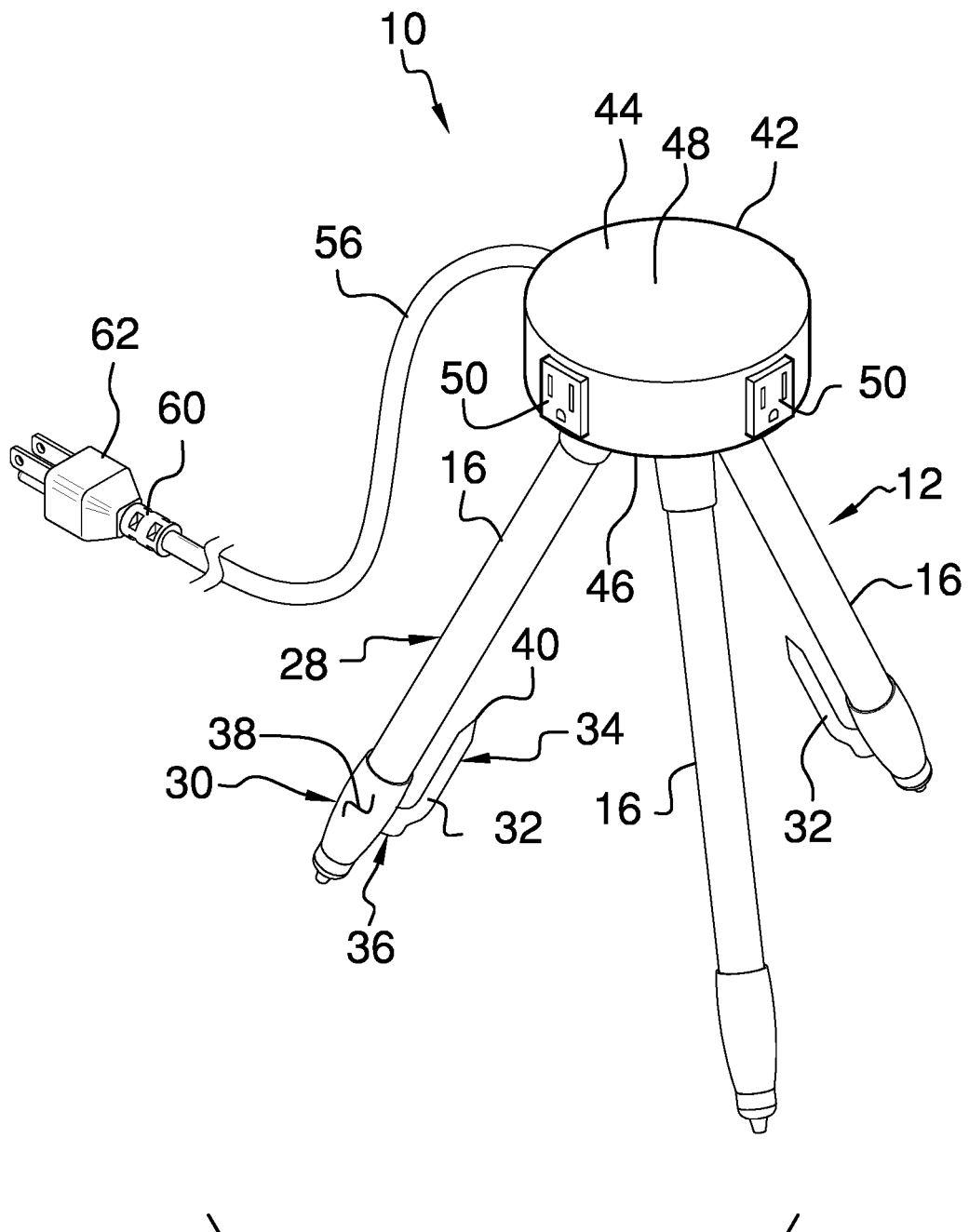
FIG. 1 is a perspective view of an elevated outlet assembly according to an embodiment of the disclosure.
Figure 2:
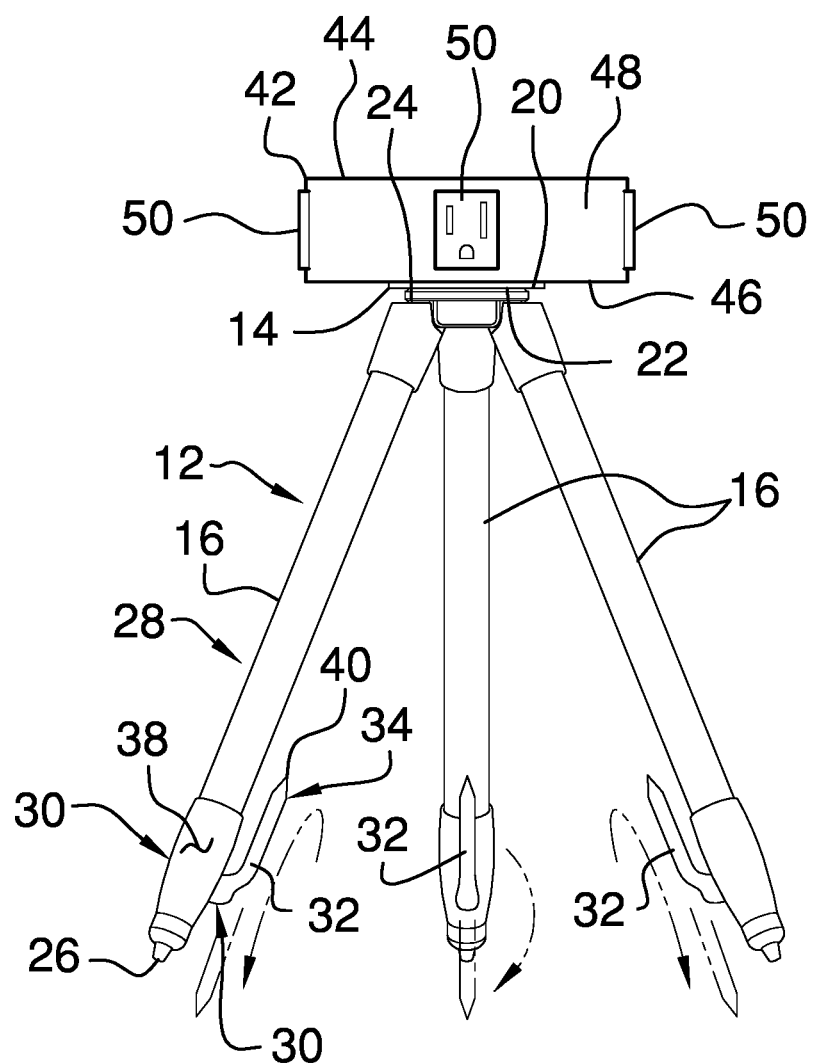
FIG. 2 is a front view of an embodiment of the disclosure.
Figure 3:
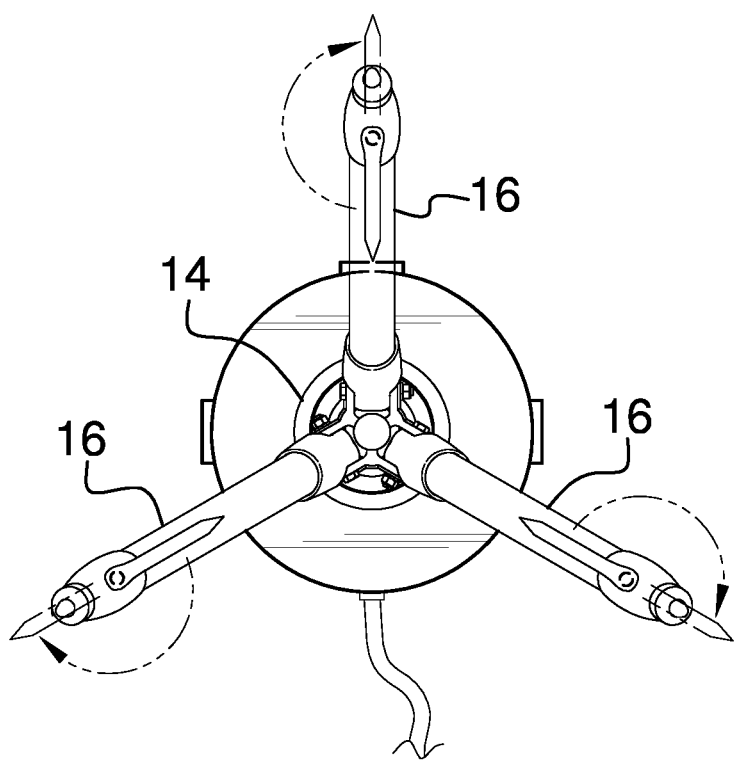
FIG. 3 is a bottom view of an embodiment of the disclosure.
Figure 4:
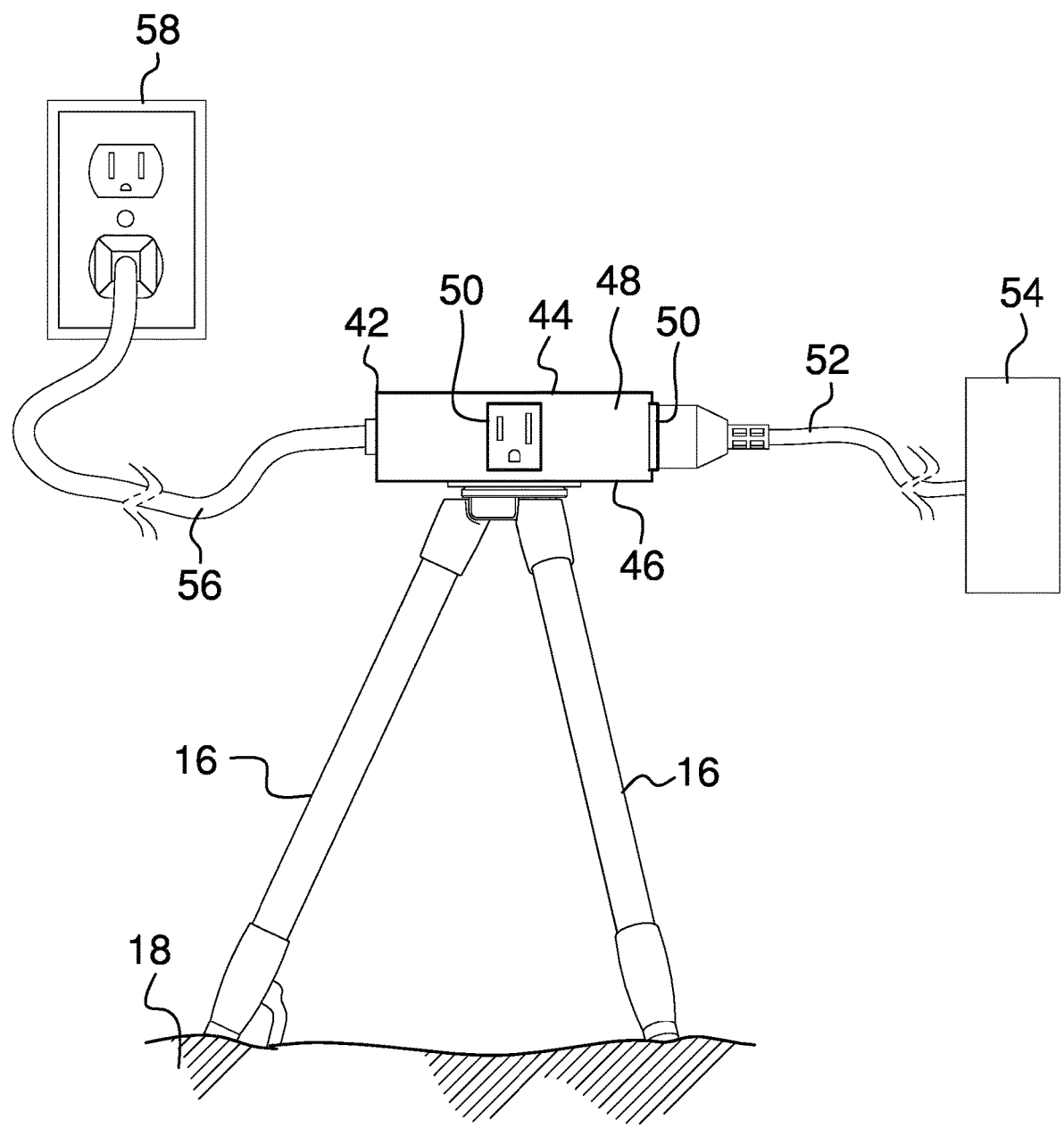
FIG. 4 is a perspective in-use view of an embodiment of the disclosure.

With reference now to the drawings, and in particular to FIGS. 1 through 4 thereof, a new outlet device embodying the principles and concepts of an embodiment of the disclosure and generally designated by the reference numeral 10 will be described.

As best illustrated in FIGS. 1 through 4, the elevated outlet assembly 10 generally comprises a tripod 12 that has a base 14 and a plurality of legs 16 each extending downwardly from the base 14. Each of the legs 16 engages a support surface 18 thereby elevating the base 14 upwardly from the support surface 18. The support surface 18 may be ground or other horizontal support surface located outdoors. The base 14 has a top surface 20 and a bottom surface 22, and each of the legs 16 has a top end 24 and a bottom end 26. Furthermore, the top end 24 of each of the legs 16 is pivotally coupled to the bottom surface 22 of the base 14. Each of the legs 16 has a first section 28 which slidably engages a second section 30 such that each of the legs 16 has a telescopically adjustable height. Additionally, the top end 24 of each of the legs 16 is associated with the first section 28 and the bottom end 26 of each of the legs 16 is associated with the second section 30.

A plurality of spikes 32 is provided and each of the spikes 32 is rotatably coupled to a respective one of the legs 16. Each of the spikes 32 is rotatable into a deployed position to penetrate the support surface 18 for retaining the legs 16 of the tripod 12 in a preferred location on the support surface 18. Additionally, each of the spikes 32 is rotatable into a stored position. Each of the spikes 32 comprises a leg 34 and a foot 36, and the foot 36 corresponding to each of the spikes 32 is pivotally coupled to an outer surface 38 of the second section 30 of the respective leg 34 of the tripod 12 at a point that is located adjacent to the bottom end 26 of the respective leg 34 of the tripod 12.

The leg 34 of each of the spikes 32 is spaced from and is oriented parallel to the respective leg 34 of the tripod 12 when the spikes 32 are positioned in either the deployed position or the stored position. Furthermore, the leg 34 of each of the spikes 32 extends upwardly along the respective leg 34 of the tripod 12 when the spikes 32 are in the stored position. Conversely, the leg 34 of each of the spikes 32 extends downwardly along the respective leg 34 of the tripod 12 when the spikes 32 are in the deployed position. The leg 34 of each of the spikes 32 has a distal end 40 with respect to the foot 36 and the distal end 40 tapers to a point for penetrating the support surface 18.

A disk 42 is provided and the disk 42 is disposed on the base 14. The disk 42 has an upper side 44, a lower side 46 and perimeter side 48 extending between the upper side 44 and the lower side 46. Moreover, the lower side 46 is disposed on the top surface 20 of the base 14 of the tripod 12. A plurality of female electrical outlets 50 is each integrated into the disk 42. In this way each of the female electrical outlets 50 can receive a power plug 52 from an electronic device 54. The electronic device 54 may be a power tool, a power washer, an audio component or any other type of electronic device that is commonly employed outdoors.

Each of the female electrical outlets 50 is elevated when the tripod 12 is positioned on the support surface 18. In this way the plurality of female electrical outlets 50 inhibit the power plug 52 from the electronic device 54 from coming into contact with moisture on the support surface 18. Thus, the electronic device 54 is protected from a short circuit or other type of electrical hazard that could potentially result from being exposed to water. Each of the female electrical outlets 50 is integrated into the perimeter side 48 of the disk 42, and the female electrical outlets 50 are spaced apart from each other and are distributed around the disk 42.

A power cord 56 is coupled to and extends away from the disk 42 and the power cord 56 can be plugged into a power source 58, such as a female electrical plug that is a component of an electrical system of a building, for example. The power cord 56 is electrically coupled to each of the female electrical outlets 50 thereby facilitating each of the female electrical outlets 50 to supply electrical power to the respective electronic device 54. The power cord 56 extends away from the perimeter side 48 of the disk 42 and the power cord 56 has a distal end 60 with respect to the perimeter side 48. Additionally, a male plug 62 is electrically coupled to the distal end 60 of the power cord 56 the male plug 62 can be plugged into the power source 58.

In use, the tripod 12 is positioned at a strategic location outdoors and each of the spikes 32 is rotated into the deployed position to facilitate the spikes 32 to penetrate the support surface 18. In this way the female electrical outlets 50 on the disk 42 are elevated above the support surface 18. The power cord 56 is plugged into the power source 58 and one or more of the electronic devices 54 is plugged into the female electrical outlets 50. In this way the female electrical outlets 50 facilitate the electronic devices 54 to be supplied with electrical power without coming into contact with moisture on the support surface 18. Thus, the possibility of a short circuit or other electrical fault is eliminated along with the potential for electrocution that could exist if the female electrical outlets 50 are exposed to water.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An elevated outlet assembly for elevating electrical outlets to inhibit the electrical outlets from being exposed to moisture on the ground, said assembly comprising:
   a tripod having a base and a plurality of legs each extending downwardly from said base wherein each of said legs is configured to engage a support surface thereby elevating said base upwardly from the support surface, said base having a top surface and a bottom surface, each of said legs having a top end and a bottom end, said top end of each of said legs being pivotally coupled to said bottom surface of said base, each of said legs having a first section slidably engaging a second section such that each of said legs has a telescopically adjustable height, said top end of each of said legs being associated with said first section, said bottom end of each of said legs being associated with said second section;
   a plurality of spikes, each of said spikes being rotatably coupled to a respective one of said legs, each of said spikes being rotatable into a deployed position wherein each of said spikes is configured to penetrate the support surface for retaining said legs in a preferred location on the support surface, each of said spikes being rotatable into a stored position;
   a disk being disposed on said base, said disk having an upper side, a lower side and a perimeter side extending between said upper side and said lower side, said lower side being disposed on said top surface of said base of said tripod, each of said legs being configurable in an extended position such that said leg has an extended height between said top end and said bottom end greater than three times a height of said disk between said upper side and said lower side;
   a plurality of female electrical outlets, each of said female electrical outlets being integrated into said disk wherein each of said female electrical outlets is configured to receive a power plug from an electronic device, each of said female electrical outlets being elevated when said tripod is positioned on the support surface wherein said plurality of female electrical outlets is configured to inhibit the power plug from the electronic device from coming into contact with moisture on the support surface; and a power cord being coupled to and extending away from said disk wherein said power cord is configured to be plugged into a power source, said power cord being electrically coupled to each of said female electrical outlets wherein each of said female electrical outlets is configured to supply electrical power to the respective electronic device.

2. The assembly according to claim 1, wherein each of said spikes comprising a leg and a foot, said foot corresponding to each of said spikes being pivotally coupled to an outer surface of said second section of said respective leg of said tripod at a point being located adjacent to said bottom end of said respective leg of said tripod, said leg of each of said spikes being spaced from and being oriented parallel to said respective leg of said tripod when said spikes are positioned in either said deployed position or said stored position.

3. The assembly according to claim 2, Wherein said leg of each of said spikes extends upwardly along said respective leg of said tripod when said spikes are in said stored position, said leg of each of said spikes extending downwardly along said respective leg of said tripod when said spikes are in said deployed position, said leg of each of said spikes having a distal end with respect to said foot, said distal end tapering to a point wherein said distal end of said leg of each of said spikes is configured to penetrate the support surface.

4. The assembly according to claim 2, wherein:
each of said female electrical outlets is integrated into said perimeter side of said disk, said female electrical outlets being spaced apart from each other and being distributed around said disk; and
said power cord extends away from said perimeter side of said disk, said power cord having a distal end with respect to said perimeter side, said distal end of said power cord having a male plug being electrically coupled to said distal end of said power cord.

5. An elevated outlet assembly for elevating electrical outlets to inhibit the electrical outlets from being exposed to moisture on the ground, said assembly comprising:
a tripod having a base and a plurality of legs each extending downwardly from said base wherein each of said legs is configured to engage a support surface thereby elevating said base upwardly from the support surface, said base having a top surface and a bottom surface, each of said legs having a top end and a bottom end, said top end of each of said legs being pivotally coupled to said bottom surface of said base, each of said legs having a first section slidably engaging a second section such that each of said legs has a telescopically adjustable height, said top end of each of said legs being associated with said first section, said bottom end of each of said legs being associated with said second section;
a plurality of spikes, each of said spikes being rotatably coupled to a respective one of said legs, each of said spikes being rotatable into a deployed position wherein each of said spikes is configured to penetrate the support surface for retaining said legs of said tripod in a preferred location on the support surface, each of said spikes being rotatable into a stored position, each of said spikes comprising a leg and a foot, said foot corresponding to each of said spikes being pivotally coupled to an outer surface of said second section of said respective leg of said tripod at a point being located adjacent to said bottom end of said respective leg of said tripod, said leg of each of said spikes being spaced from and being oriented parallel to said respective leg of said tripod when said spikes are positioned in either said deployed position or said stored position, said leg of each of said spikes extending upwardly along said respective leg of said tripod when said spikes are in said stored position, said leg of each of said spikes extending downwardly along said respective leg of said tripod when said spikes are in said deployed position, said leg of each of said spikes having a distal end with respect to said foot, said distal end tapering to a point wherein said distal end of said leg of each of said spikes is configured to penetrate the support surface;

a disk being disposed on said base, said disk having an upper side, a lower side and a perimeter side extending between said upper side and said lower side, said lower side being disposed on said top surface of said base of said tripod, each of said legs being configurable in an extended position such that said leg has an extended height between said top end and said bottom end greater than three times a height of said disk between said upper side and said lower side;

a plurality of female electrical outlets, each of said female electrical outlets being integrated into said disk wherein each of said female electrical outlets is configured to receive a power plug from an electronic device, each of said female electrical outlets being elevated when said tripod is positioned on the support surface wherein said plurality of female electrical outlets is configured to inhibit the power plug from the electronic device from coming into contact with moisture on the support surface, each of said female electrical outlets being integrated into said perimeter side of said disk, said female electrical outlets being spaced apart from each other and being distributed around said disk; and a power cord being coupled to and extending away from said disk wherein said power cord is configured to be plugged into a power source, said power cord being electrically coupled to each of said female electrical outlets wherein each of said female electrical outlets is configured to supply electrical power to the respective electronic device, said power cord extending away from said perimeter side of said disk, said power cord having a distal end with respect to said perimeter side, said distal end of said power cord having a male plug being electrically coupled to said distal end of said power cord.

\* \* \* \* \*